(12) United States Patent
Lee

(10) Patent No.: US 12,469,495 B2
(45) Date of Patent: Nov. 11, 2025

(54) DIALOGUE SYSTEM AND CONTROL METHOD THEREOF

(71) Applicants: Hyundai Motor Company, Seoul (KR); Kia Corporation, Seoul (KR)

(72) Inventor: In Jik Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 233 days.

(21) Appl. No.: 18/081,201

(22) Filed: Dec. 14, 2022

(65) Prior Publication Data

US 2023/0317080 A1    Oct. 5, 2023

(30) Foreign Application Priority Data

Apr. 5, 2022   (KR) ........................ 10-2022-0042297

(51) Int. Cl.
  *G10L 15/22*    (2006.01)
  *G10L 13/02*    (2013.01)
  *G10L 15/18*    (2013.01)
  *G10L 15/28*    (2013.01)

(52) U.S. Cl.
  CPC ............ *G10L 15/222* (2013.01); *G10L 13/02* (2013.01); *G10L 15/1815* (2013.01); *G10L 15/28* (2013.01); *G10L 2015/228* (2013.01)

(58) Field of Classification Search
  None
  See application file for complete search history.

(56) References Cited

U.S. PATENT DOCUMENTS

| | | | |
|---|---|---|---|
| 12,126,871 B1 * | 10/2024 | Bajaj | H04N 21/47 |
| 2004/0044516 A1 * | 3/2004 | Kennewick | G10L 15/1822 |
| | | | 704/E15.04 |
| 2004/0193420 A1 * | 9/2004 | Kennewick | G06F 16/3329 |
| | | | 704/270.1 |
| 2014/0067403 A1 * | 3/2014 | Burke | G06F 3/167 |
| | | | 704/E21.001 |
| 2014/0078938 A1 * | 3/2014 | Lachapelle | A61B 17/3211 |
| | | | 370/260 |
| 2016/0373269 A1 * | 12/2016 | Okubo | H04L 12/282 |
| 2017/0084278 A1 * | 3/2017 | Jung | G10L 17/02 |
| 2018/0090132 A1 * | 3/2018 | Ikeno | G10L 15/1815 |
| 2020/0302926 A1 * | 9/2020 | Aggarwal | G06F 9/4881 |
| 2020/0335128 A1 * | 10/2020 | Sheeder | G10L 25/21 |
| 2021/0125611 A1 * | 4/2021 | Yu | G10L 15/197 |
| 2023/0223023 A1 * | 7/2023 | Rastrow | G10L 15/1815 |
| | | | 704/275 |

* cited by examiner

*Primary Examiner* — Jakieda R Jackson
(74) *Attorney, Agent, or Firm* — Morgan Lewis & Bockius LLP

(57) ABSTRACT

A dialogue system includes a voice recognition module provided to execute voice recognition, a storage device in which a result of the executed voice recognition is stored, and a controller configured to determine priorities of an external event and the voice recognition when the external event occurs while an utterance of a user is input, and pause the execution of the voice recognition and store a result of the voice recognition of the utterance of the user inputted before the pause in the storage device, when the controller concludes that the priority of the external event is higher than the priority of the voice recognition.

18 Claims, 9 Drawing Sheets

| EXTERNAL EVENT | PRIORITY (VS VOICE RECOGNITION) | RESULT |
|---|---|---|
| PHONE CALL TRANSMISSION /RECEPTION | HIGH | VOICE RECOGNITION PAUSE |
| REAR CAMERA DISPLAY | HIGH | VOICE RECOGNITION PAUSE |
| RADIO EXECUTION | LOW | VOICE RECOGNITION KEEPING |

DIALOGUE SYSTEM AND CONTROL METHOD THEREOF

CROSS-REFERENCE TO RELATED APPLICATION(S)

The present application claims priority to Korean Patent Application No. 10-2022-0042297, filed on Apr. 5, 2022, the entire contents of which is incorporated herein for all purposes by this reference.

BACKGROUND OF THE PRESENT DISCLOSURE

Field of the Present Disclosure

The present disclosure relates to a dialogue system capable of having a dialogue with a user and a control method thereof.

Description of Related Art

A dialogue system is a system capable of recognizing a voice of a user to identify an intention of the user and providing a service corresponding to the identified intention of the user.

The dialogue system may be linked to a specific device to control the specific device depending on an intention of a user, or may provide specific information according to the intention of the user.

Recently, such a dialogue system is also provided in a vehicle, so that a user may control the vehicle only by uttering a voice and desired information may be obtained through a dialogue with the vehicle or a desired service may be provided.

When an external event with a higher processing priority than voice recognition (e.g., a phone call reception, a hard key input, a rear camera operation, etc.) occurs while the voice recognition starts and a user utters, the dialogue system interrupts the corresponding voice recognition scenario and executes the external event with high priority.

Therefore, there is a problem in that the user has to execute a desired scenario again by re-executing a voice recognition function from the beginning after the execution of the external event is finished.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a dialogue system configured for improving the usability of a voice recognition function by pausing and resuming voice recognition when an external event occurs, and a control method thereof.

Additional aspects of the present disclosure will be set forth in part in the description which follows, and in part, will be obvious from the description, or may be learned by practice of the present disclosure.

In accordance with an aspect of the present disclosure, a dialogue system includes a voice recognition module provided to execute voice recognition, a storage device in which a result of the executed voice recognition is stored, and a controller configured to determine priorities of an external event and the voice recognition when the external event occurs while an utterance of a user is input, and pause the execution of the voice recognition and store a result of the voice recognition of the utterance of the user inputted before the pause in the storage device, when the controller concludes that the priority of the external event is higher than the priority of the voice recognition.

The controller may be configured to control the voice recognition module so that the utterance of the user is continuously input when the controller concludes that the priority of the external event is lower than the priority of the voice recognition.

The dialogue system may further include an NLU module provided to execute natural language recognition for a voice-recognized text, wherein when the execution of the voice recognition is paused, the controller may be configured to control the NLU module to execute the natural language recognition for the utterance of the user inputted before the pause, and store an execution result of the natural language recognition in the storage device.

The controller may be configured to determine whether the input of the utterance of the user is interrupted during detection due to the external event by analyzing information stored in the storage device.

When the controller concludes that the input of the utterance of the user is interrupted during the detection as a result of the determining, the controller may re-analyze whether the input of the utterance of the user is interrupted and the utterance of the user determined that the input has been interrupted and store a re-analysis result in the storage device.

When the controller concludes that the external event is finished, the controller may resume the voice recognition.

The controller may be configured to determine whether additional utterance information of the user is required based on the information stored in the storage device.

The dialogue system may further include a natural language generation module provided to generate a natural language, wherein when the controller concludes that the additional utterance information of the user is required, the controller may be configured to control the natural language generation module to generate the natural language for notifying whether the additional utterance information of the user is required.

When the controller concludes that the additional utterance information of the user is not required, the controller may be configured to control the natural language generation module to generate a natural language for inquiring whether to continue the voice recognition.

The dialogue system may further include a text to speech (TTS) module provided to convert the generated natural language into a form of voice, wherein the controller may be configured to control the TTS module to output the generated natural language in the form of voice.

The external event may include any one of a phone call transmission/reception, a rear camera display, and a hard key input.

In accordance with an aspect of the present disclosure, a method of controlling a dialogue system includes executing voice recognition, storing a result of the voice recognition, determining priorities of an external event and the voice recognition when the external event occurs while an utterance of a user is input, and pausing the execution of the voice recognition and storing a result of the voice recognition of the utterance of the user inputted before the pause in the storage device, when the controller concludes that the priority of the external event is higher than the priority of the voice recognition.

The control method may further include controlling so that the utterance of the user is continuously input when the controller concludes that the priority of the external event is lower than the priority of the voice recognition.

The control method may further include executing natural language recognition for a voice-recognized text, wherein the storing of the result of the voice recognition of the utterance of the user may include executing the natural language recognition for the utterance of the user inputted before the pause when the execution of the voice recognition is paused, and storing an execution result of the natural language recognition.

The control method may further include determining whether the input of the utterance of the user is interrupted during detection due to the external event by analyzing the stored information.

The control method may further include, when the controller concludes that the input of the utterance of the user is interrupted during the detection as a result of the determining, re-analyzing whether the input of the utterance of the user is interrupted and the utterance of the user determined that the input has been interrupted, and storing a re-analysis result in the storage device.

The control method may further include resuming the voice recognition when the controller concludes that the external event is finished.

The control method may further include determining whether additional utterance information of the user is required based on the stored information.

The control method may further include generating a natural language, wherein the generating of the natural language may include generating a natural language for notifying whether the additional utterance information of the user is required when the controller concludes that the additional utterance information of the user is required.

The generating of the natural language may include generating a natural language for inquiring whether to continue the voice recognition when the controller concludes that the additional utterance information of the user is not required.

The control method may further include converting the generated natural language into a form of voice.

The external event may include any one of a phone call transmission/reception, a rear camera display, and a hard key input.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
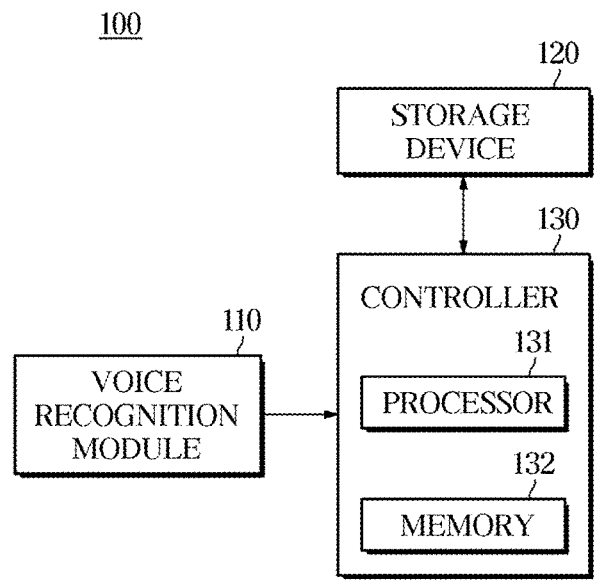
FIG. 1 is a control block diagram of a dialogue system according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Throughout the specification, like reference numerals refer to like elements. The present specification does not describe all factors of embodiments, and duplicative contents between general contents or embodiments in the field of the of the present disclosure will be omitted. The terms 'member,' 'module,' and 'device' used in the present specification may be embodied as software or hardware, and it is also possible for a plurality of 'members,' 'modules,' and 'devices' to be embodied as one component, or one 'member,' 'module,' and 'device' to include a plurality of components according to the embodiments.

Throughout the specification, when a part is referred to as being "connected" to another part, it includes not only a direct connection but also an indirect connection, and the indirect connection includes connecting through a wireless network.

Furthermore, when it is described that a part "includes" an element, it means that the element may further include other elements, not excluding the other elements unless specifically stated otherwise.

Throughout the specification, it will also be understood that when an element is referred to as being "on" or "over" another element, it may be directly on the other element or intervening elements may also be present.

The terms 'first,' 'second,' etc. are used to distinguish one element from another element, and the elements are not limited by the above-mentioned terms.

The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states an order.

Hereinafter, the operation principle and embodiments of the present disclosure will be described with reference to the accompanying drawings.

FIG. 1 is a control block diagram of a dialogue system according to an exemplary embodiment of the present disclosure.

The dialogue system 100 may include a voice recognition module 110, a controller 130, and a storage device 120.

The voice recognition module 110 may detect an utterance of a user to convert the utterance into text.

The storage device 120 may store a result of executing voice recognition. For example, text converted by voice recognition may be stored, or a result of recognizing such text through natural language recognition may be stored.

The controller 130 may include a memory 132 provided to store control programs and control data for controlling various modules, and a processor 131 provided to generate a control signal depending on the control programs and control data stored in the memory 132. The processor 131 and the memory 132 may be provided integrally or separately.

The memory 132 may store programs and data for controlling various modules.

The memory 132 may include a volatile memory for temporarily storing data, such as a static random access memory (S-RAM) and a dynamic random access memory (DRAM). Also, the memory 132 may include a non-volatile memory for long-term storage of data, such as a read only memory (ROM), an erasable programmable read only memory (EPROM), and an electrically erasable programmable read only memory (EEPROM).

The processor 131 may include various logic circuits and arithmetic circuits, process data according to a program provided from the memory 132 and generate a control signal according to a processing result.

The controller 130 may determine whether an external event has occurred while receiving an utterance of the user to execute voice recognition.

External events may include a phone call transmission/reception, a rear camera display, a hard key operation, and the like.

When an external event occurs while the utterance of the user is input, the controller 130 may determine priorities of the external event and the voice recognition.

Priorities of various operations as above may be predetermined and stored in the memory 132.

When it is determined that the priority of an external event is higher than a priority of a voice recognition function, the controller 130 may pause the execution of the voice recognition and store a voice recognition result of the utterance of the user inputted before it is paused in the storage device 120. That is, when an external event occurs while the user utters for voice recognition, and the importance of the present event is higher than that of the voice recognition, the voice recognition may be temporarily interrupted and the external event may be executed.

In the instant case, after content of the utterance input by the user before the external event occurs is stored in the storage device 120 and then the external event is finished, only content uttered by the user after the previously stored content may be additionally executed.

Determining the priorities of an external event and voice recognition may be performed by a separate priority determination module.

Each operation may be performed by a separate module, such as an operation module to phase execution of voice recognition, and a storage module to store a voice recognition result in the storage device 120. However, components of the dialogue system 100 are divided based on their operations or functions, and all or portion thereof may share the memory 132 or the processor 131. That is, the voice recognition module 110, the priority determination module, the operation module, the storage module, and the controller 130 do not necessarily refer to physically separated components. That is, the components may be concepts included in the controller 130.

The dialogue system 100 described above may be implemented by the at least one memory 132 in which a program for performing the above-described operation is stored and the at least one processor 131 for executing the stored program.

Figure 2:
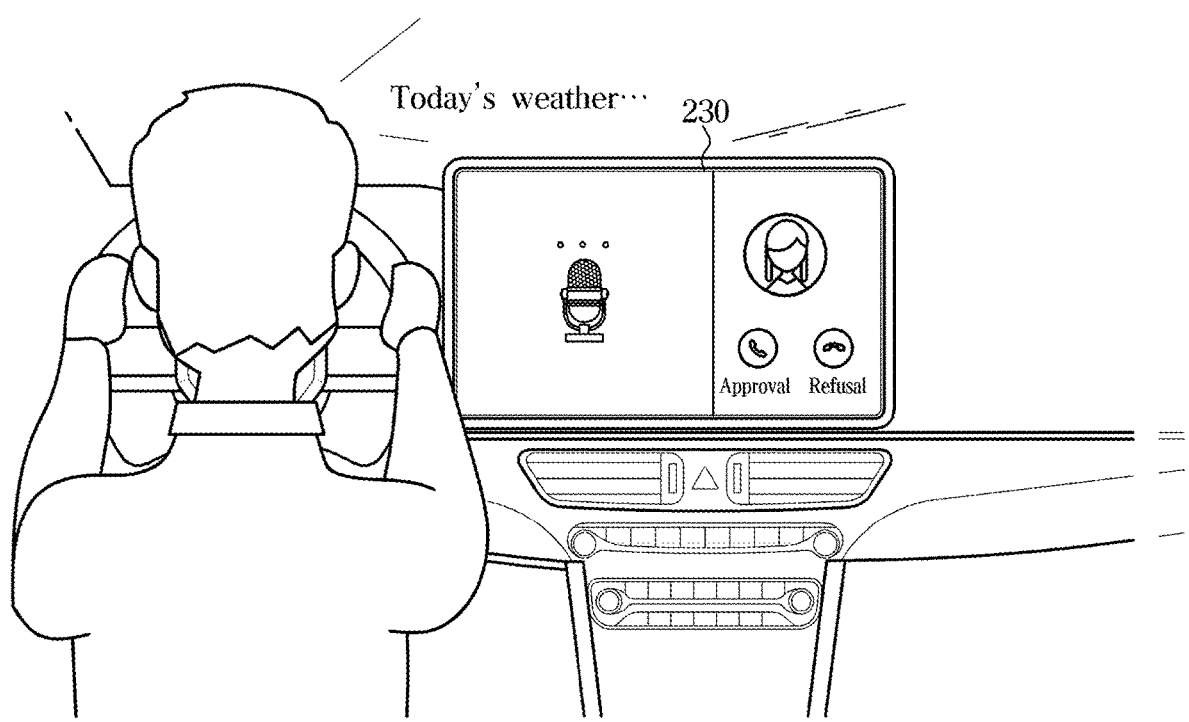
FIG. 2 is a diagram illustrating that an external event occurs while voice recognition is executed according to an exemplary embodiment of the present disclosure.

FIG. 2 is a diagram illustrating that an external event occurs while voice recognition is executed according to an exemplary embodiment of the present disclosure.

When an external event occurs while voice recognition is executed and the priority of the external event is higher than the priority of the voice recognition function, the execution of the voice recognition may be paused. An example of such an external event may be reception of a phone call.

Referring to FIG. 2, when a phone call is received while the user utters for voice recognition, the controller 130 may determine that the priority of the phone call reception event is higher than the priority of the voice recognition function, and may pause the execution of the voice recognition. In FIG. 2, as a phone call is received the moment the user inputs the utterance "Today's weather.", the voice recognition operation thereafter is not executed and only "Today's weather." is input.

The controller 130 may store an input result of "Today's weather", which is the utterance input by the user, in the storage device 120.

Figures 3, 4:
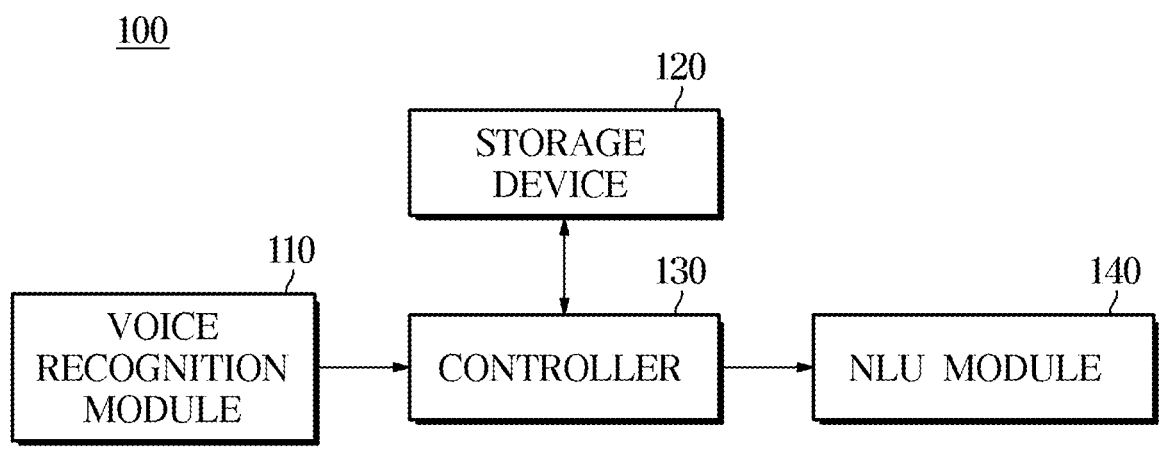
FIG. 3 is a diagram illustrating an operation depending on a priority difference between a voice recognition function and external events, according to an exemplary embodiment of the present disclosure.
FIG. 4 is a control block diagram of the dialogue system according to an exemplary embodiment of the present disclosure.

FIG. 3 is a diagram illustrating an operation depending on a priority difference between a voice recognition function and external events, according to an exemplary embodiment of the present disclosure.

As exemplified above, in the case of transmission and reception of a phone call, it may be set to have a higher priority than the voice recognition function. The priority may be predetermined and stored in the storage device 120.

Therefore, when a phone call is received or, conversely, a phone call is transmitted while voice recognition is executed, the execution of the voice recognition is paused from a point in time when the phone call is transmitted/received.

Because there is a case in which the rear camera is absolutely necessary in a parking situation, etc., the operation of the rear camera may also be set to have a higher priority than the voice recognition function.

Therefore, when the rear camera is operated while voice recognition is executed, the execution of the voice recognition is paused from a point in time when the rear camera is operated.

On the other hand, a function with a relatively low importance, such as a radio execution function, may be set to have a lower priority than the voice recognition function.

When it is determined that the priority of an external event such as a radio execution is lower than the priority of voice recognition, the controller 130 may control the voice recognition module 110 so that utterances of the user is continuously input.

That is, all of the utterances of the user may be input by continuously executing the voice recognition function without pausing. Thereafter, when the execution of the voice recognition is finished, an external event with a low priority such as the radio execution may be executed.

FIG. 4 is a control block diagram of the dialogue system according to an exemplary embodiment of the present disclosure.

The dialogue system 100 may further include a natural language understanding (NLU) module 140 to perform natural language recognition based on a text converted by the voice recognition module 110.

The current voice recognition function may transmit the received voice data to an embedded engine and a server engine in the vehicle 10 at the same time when the user utters a command to a microphone 210 connected to a head unit in the vehicle 10.

That is, the NLU module 140 may be included in the vehicle 10 or may be provided in a separate server.

Therefore, for natural language recognition, the controller 130 according to the present disclosure may also transmit a text to the NLU module 140 included in the vehicle 10 or the NLU module 140 provided in a separate server.

When the execution of the voice recognition is paused due to the occurrence of an external event, the controller 130 may control the NLU module 140 to execute natural language recognition for the utterances of the user inputted before the execution of the voice recognition is paused.

The controller 130 may also store a result of the natural language recognition executed by the NLU module 140 in the storage device 120.

Figure 5:
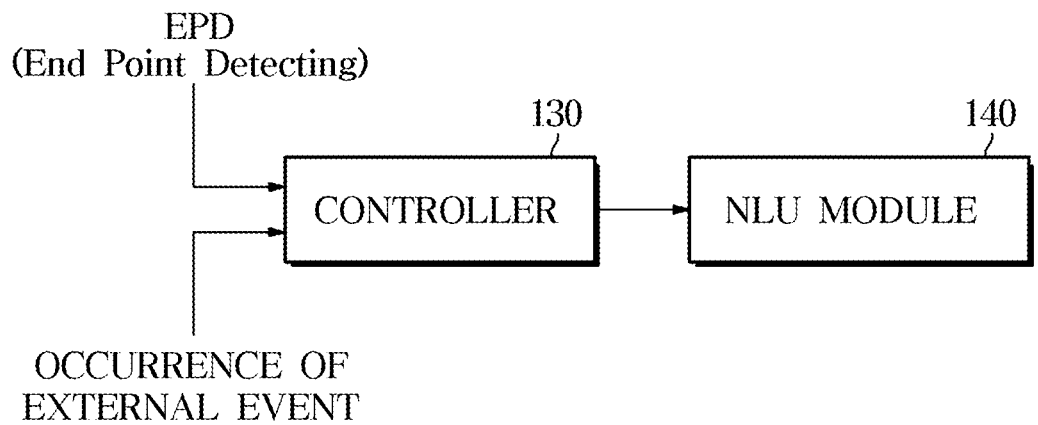
FIG. 5 is a diagram illustrating that a controller is configured to control an NLU module for natural language recognition under a specific condition, according to an exemplary embodiment of the present disclosure.

FIG. 5 is a diagram illustrating that a controller is configured to control an NLU module for natural language recognition under a predetermined condition, according to an exemplary embodiment of the present disclosure.

In general, when an ending point is detected in an utterance of the user during voice recognition, it is determined that the utterance of the user has been finished, and thus natural language recognition for this may be executed.

However, in the present disclosure, as will be described later, to obtain information for requesting an additional utterance from the user after the utterance of the user is cut midway, in a case where even though the ending point is not detected, an external event occurs and the execution of voice recognition will be paused, natural language recognition may be executed for the utterances inputted before the pause.

That is, in a case of EPD in which the ending point is detected in the utterance of the user, or in a case in which the execution of voice recognition is paused because an external event occurs and the priority of the external event is higher than the priority of the voice recognition, the NLU module 140 may be controlled for natural language recognition for the utterance recognized up to a corresponding time point.

Figure 6:
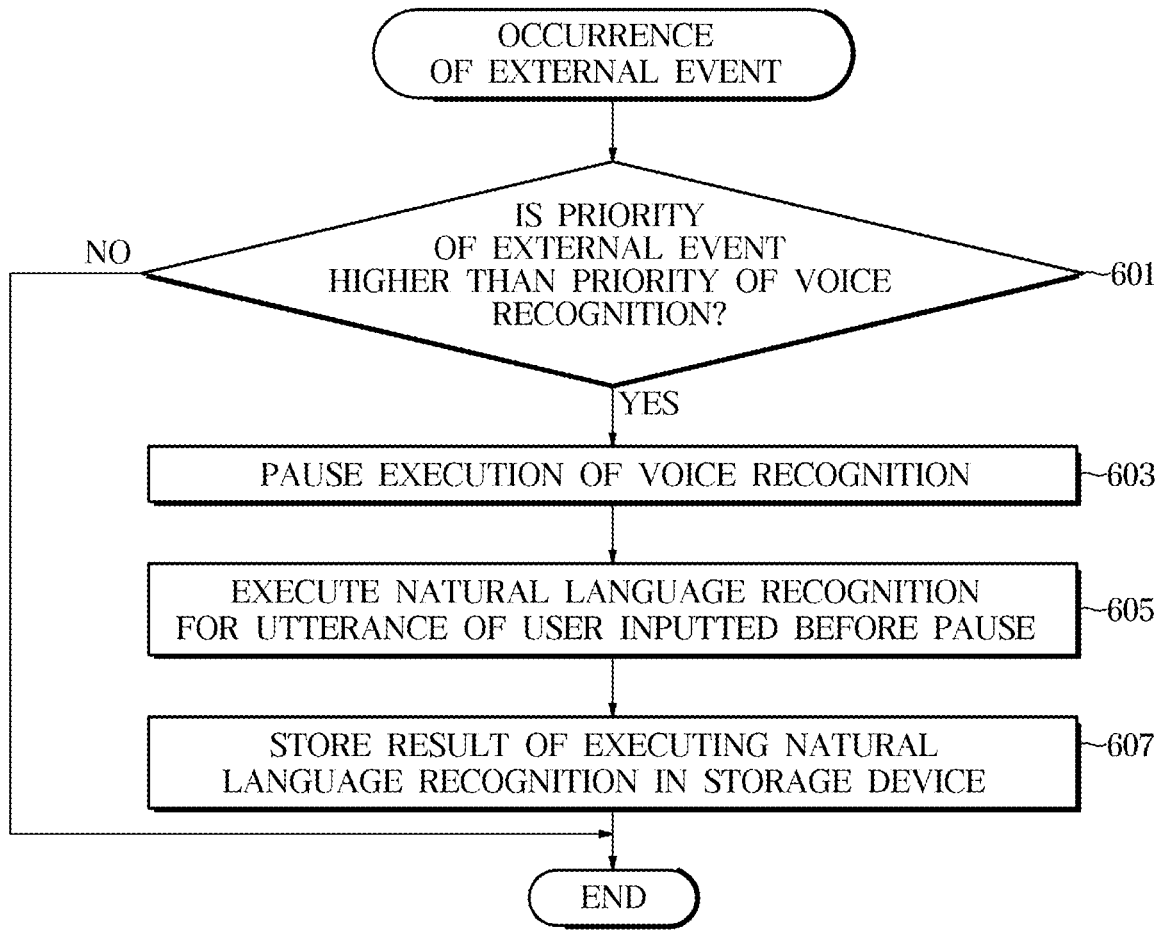
FIG. 6 is a flowchart illustrating an operation of the dialogue system according to an exemplary embodiment of the present disclosure.

FIG. 6 is a flowchart illustrating an operation of the dialogue system according to an exemplary embodiment of the present disclosure.

As described above, when an external event occurs, it may be determined whether the priority of the external event is higher than the priority of the voice recognition (601). As a result of the determination, when the priority of the external event is higher (YES in 601), the execution of the voice recognition may be paused (603), and natural language recognition may be executed for the utterance of the user inputted before the pause (605).

When the natural language recognition is executed in the present way, a result of executing the natural language recognition may be stored in the storage device 120 (607).

The controller 130 may determine whether additional utterance information of the user is required based on information stored in the storage device 120. That is, the controller 130 may determine whether voice data of the user is cut midway by analyzing a frequency domain of the voice data stored in the storage device 120.

Through the present determination, as will be described later, an additional utterance may be requested to the user or an inquiry for continuation of a request function or the like may be provided.

Figure 7:
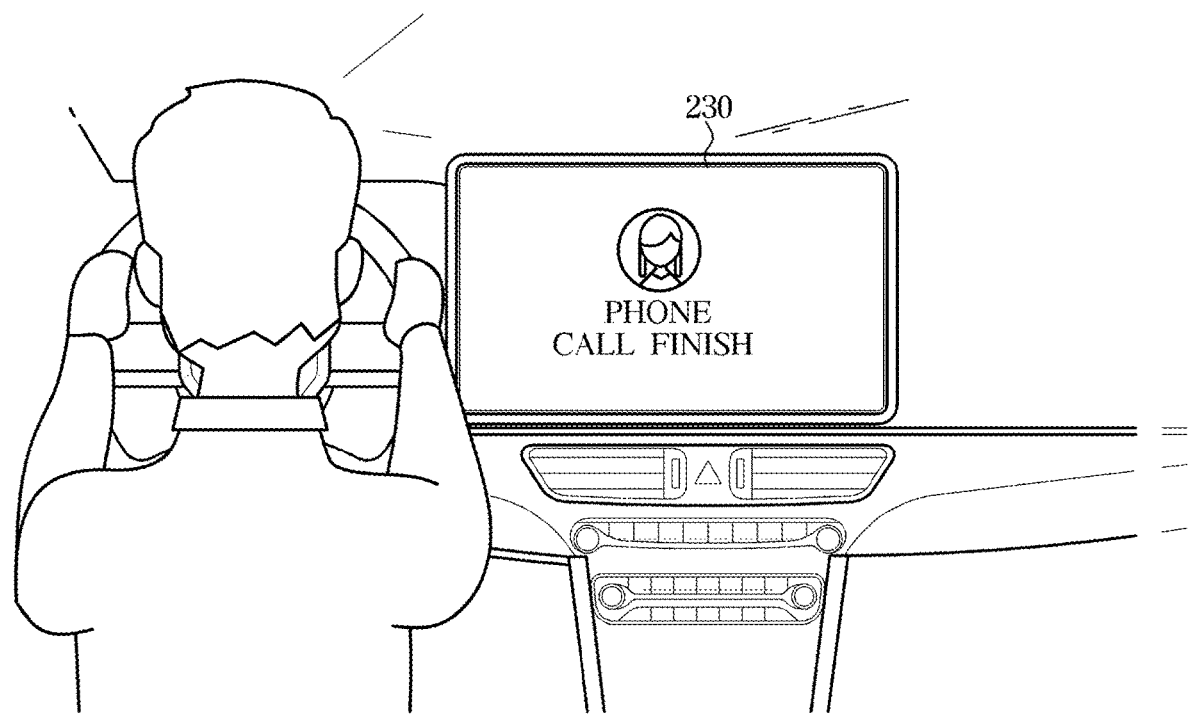
FIG. 7 is a diagram illustrating that generation of an external event is finished according to an exemplary embodiment of the present disclosure.

FIG. 7 is a diagram illustrating that generation of an external event is finished according to an exemplary embodiment of the present disclosure.

In a case in which the voice recognition is interrupted due to the occurrence of an external event having a higher priority than the voice recognition, when the external event is finished, the interrupted voice recognition function may be resumed.

Although FIG. 7 illustrates a case where a phone call is finished, when the other external event described above, that is, the hard key input or the rear camera operation is finished, the voice recognition function may be resumed based on an ending time point.

When the voice recognition function resumes, by analyzing the utterance of the user before the pause and determining whether the utterance of the user is complete or cut midway, a response appropriate for each case needs to be provided to the user.

Figure 8A:
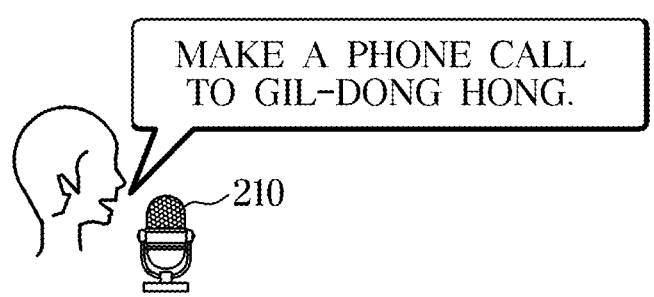
FIG. 8A and FIG. 8B are diagrams illustrating that input of utterance of a user is interrupted during detection, according to an exemplary embodiment of the present disclosure.
Figure 8B:
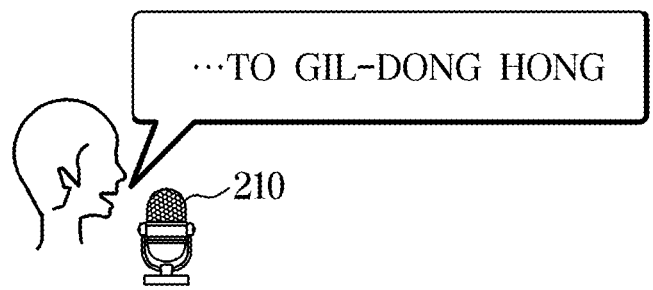

FIG. 8A and FIG. 8B are diagrams illustrating that input of utterance of a user is interrupted during detection, according to an exemplary embodiment of the present disclosure.

As illustrated in FIG. 8A, there may be a case in which voice recognition is interrupted as an external event occurs after the user utters "Make a phone call to Gil-Dong Hong".

Furthermore, as illustrated in FIG. 8B, there may be a case in which voice recognition is interrupted while the sentence is not complete as the user uttered only "To Hong Gil-dong . . . ", but an external event occurs.

The controller 130 may determine whether the input of the utterance of the user is interrupted during detection due to an external event, that is, whether the sentence is not completed and cut midway, based on the information stored in the storage device 120.

As a result of the determination, when it is determined that the input is interrupted during detection while the sentence is not completed, because additional utterance information of the user is required afterward, it is necessary to provide a request corresponding thereto to the user, and when the sentence is completed, it is necessary to inquire to the user whether a function corresponding to the utterance of the user is executed.

When the controller concludes that the input of the utterance of the user is interrupted during the detection as a result of the determining, the controller 130 may reanalyze whether the input of the utterance of the user is interrupted and the utterance of the user determined that the input has been interrupted, and store the reanalysis result in the storage device 120.

That is, the controller 130 may analyze the information that the utterance of the user was cut midway and the content of the utterance before it is cut, and then perform re-analysis to request additional information afterward.

The controller 130 may determine each of these cases and control to generate a response corresponding to each case.

Figure 9:
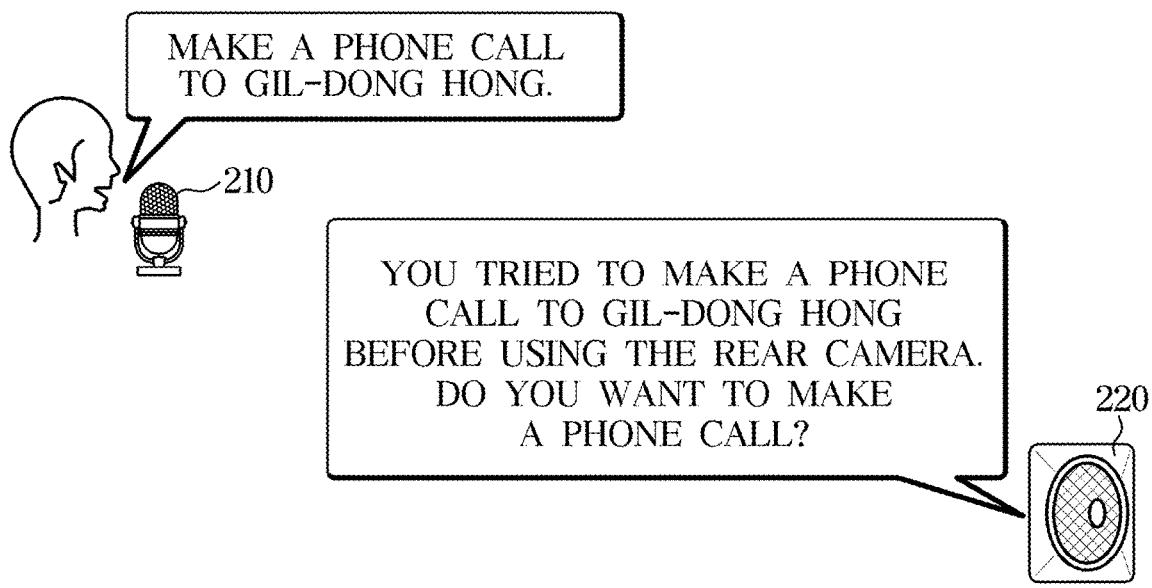
FIG. 9 is a diagram illustrating that the dialogue system responds to an utterance of the user according to an exemplary embodiment of the present disclosure.
Figure 10:
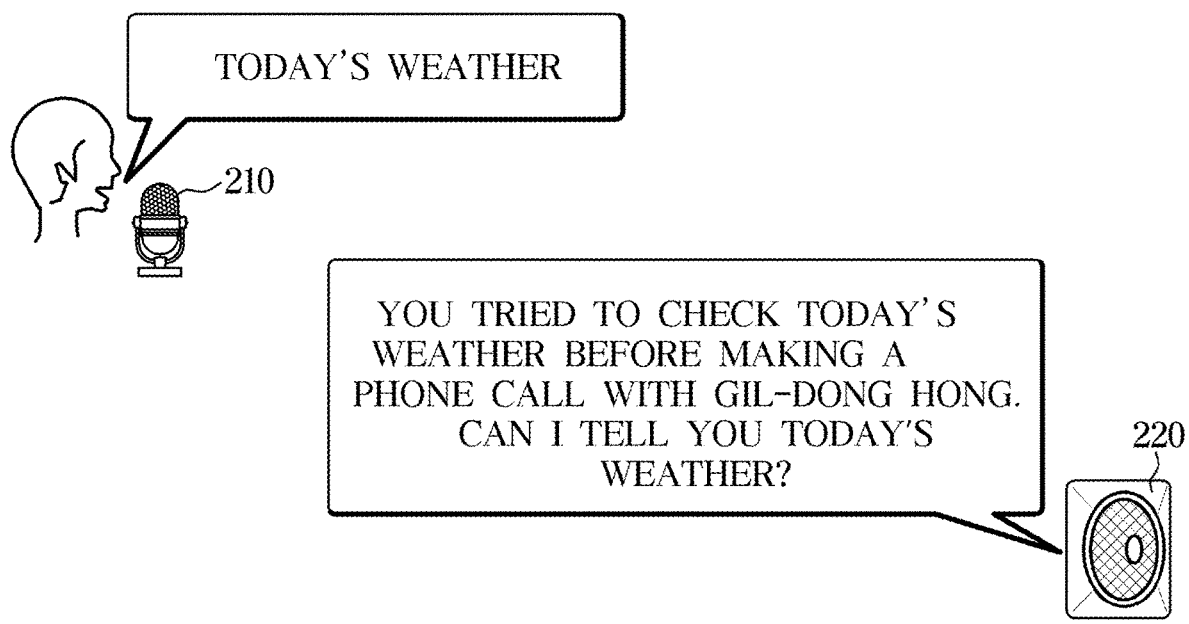
FIG. 10 is a diagram illustrating that the dialogue system responds to an utterance of the user according to an exemplary embodiment of the present disclosure.

FIG. 9 is a diagram illustrating that the dialogue system responds to an utterance of the user according to an exemplary embodiment of the present disclosure, and FIG. 10 is a diagram illustrating that the dialogue system responds to an utterance of the user according to an exemplary embodiment of the present disclosure.

When it is determined that natural language recognition is executed for utterances of the user inputted before the execution of the voice recognition is paused, and the input is not interrupted midway as the utterances of the user are all detected as a result of recognition, the controller 130 may determine that an additional utterance of the user is not required.

Furthermore, as the result of recognition, when it is determined that the utterances of the user are not all detected and the input is interrupted midway, the controller 130 may determine that an additional utterance of the user is required.

As illustrated in FIG. 9, when the utterance " . . . to Gil-Dong Hong" is input and the voice recognition is paused, the controller 130 may determine that additional utterance information of the user is required.

That is, because an additional utterance of the user is required as the voice recognition is interrupted before utterances of the user are all input, the controller 130 may control a natural language generation module to generate a natural language for notifying whether additional utterance information of the user is required.

On the other hand, as illustrated in FIG. 10, when the utterance "Today's weather" is input and the voice recognition is paused, the controller 130 may determine that additional utterance information of the user is not required.

That is, because the utterances of the user have been all input and a function corresponding to the utterances of the user may be executed without an additional utterance, in the instant case, the controller 130 may control the natural language generation module to generate a natural language for inquiring whether to continue the voice recognition.

In the case of FIG. 9, to request additional utterance information of the user, the contents "You tried to make a phone call to Gil-dong Hong before using the rear camera. Do you want to make a phone call?" may be generated and output through the natural language generation module.

In the case of FIG. 10, to execute a function corresponding to the utterance of the user, an inquiry as to whether to continue or not may be made. For example, the contents "You tried to check today's weather before making a phone call with Gil-dong Hong. Can I tell you today's weather?" may be generated and output through the natural language generation module.

Accordingly, because even through the voice recognition is interrupted midway due to the occurrence of an external event, the user only needs to utter additional information following the existing utterance information, the inconvenience of having to execute the voice recognition from the beginning after the end portion of the external event may be eliminated.

The natural language generated as described above may be converted into a form of voice by a text to speech (TTS) module that converts a natural language into a form of voice, and may be output through an output device such as a speaker 220.

Figure 11:
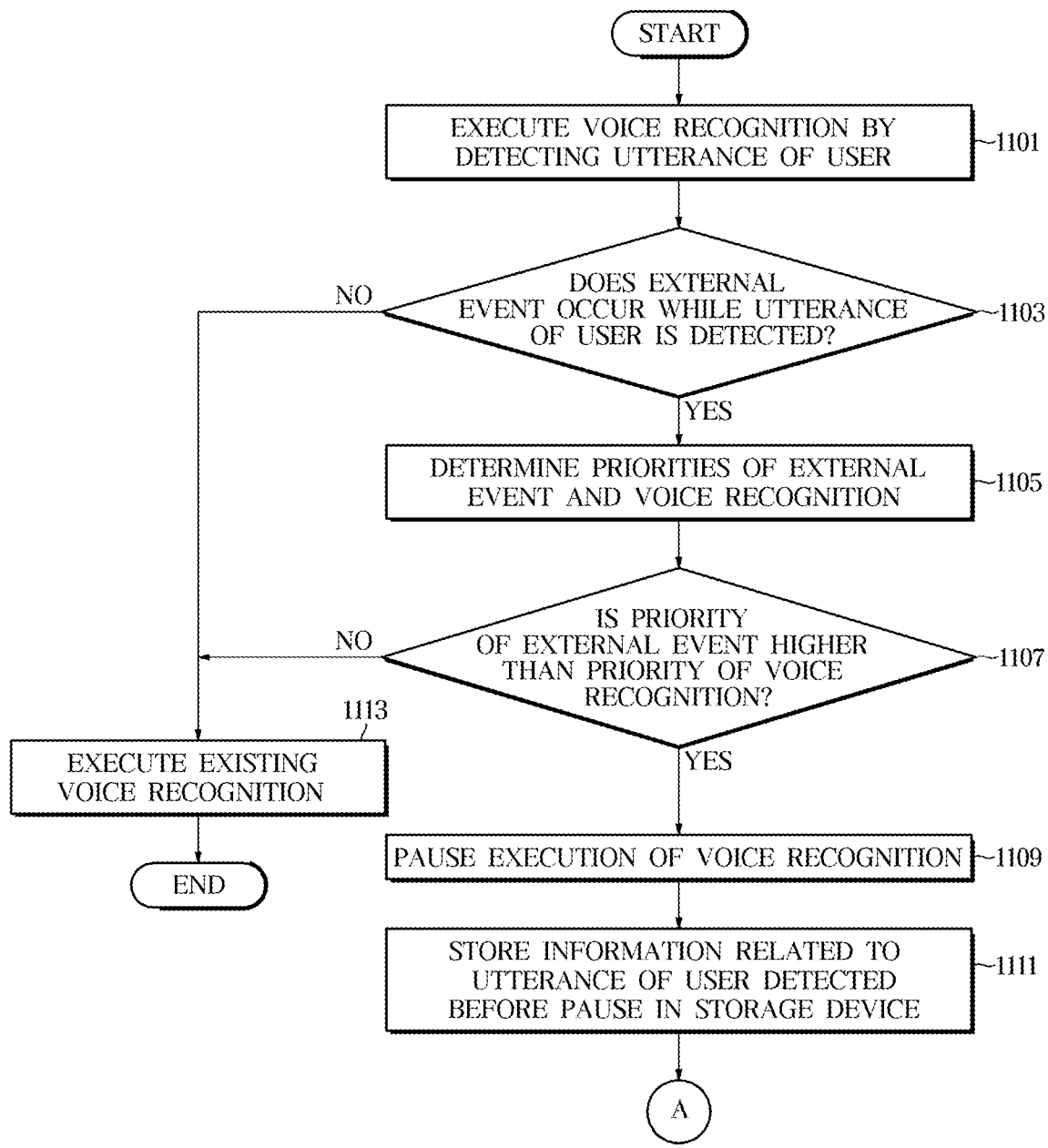
FIG. 11 is a flowchart illustrating a method of controlling the dialogue system according to an exemplary embodiment of the present disclosure.

FIG. 11 is a flowchart illustrating a method of controlling the dialogue system according to an exemplary embodiment of the present disclosure.

The voice recognition module 110 may execute voice recognition by detecting an utterance of the user (1101).

When an external event occurs while the utterance of the user is input (YES in 1103), the controller 130 may determine the priorities of the external event and the voice recognition (1105).

As a result of the determination, when the priority of the external event is higher than the priority of the voice recognition (YES in 1107), the controller 130 may pause the execution of the voice recognition (1109) and store information related to the utterance of the user detected before the pause in the storage device 120 (1111).

External events that have a higher priority than voice recognition may include a phone call transmission/reception, a rear camera display, a hard key input, and the like.

This priority may be predetermined and stored in the storage device 120.

When an external event does not occur while the utterance of the user is input (NO in 1103), or when the priority of the external event is not higher than the priority of the voice recognition (NO in 1107), the controller 120 executes the existing voice recognition.

Figure 12:
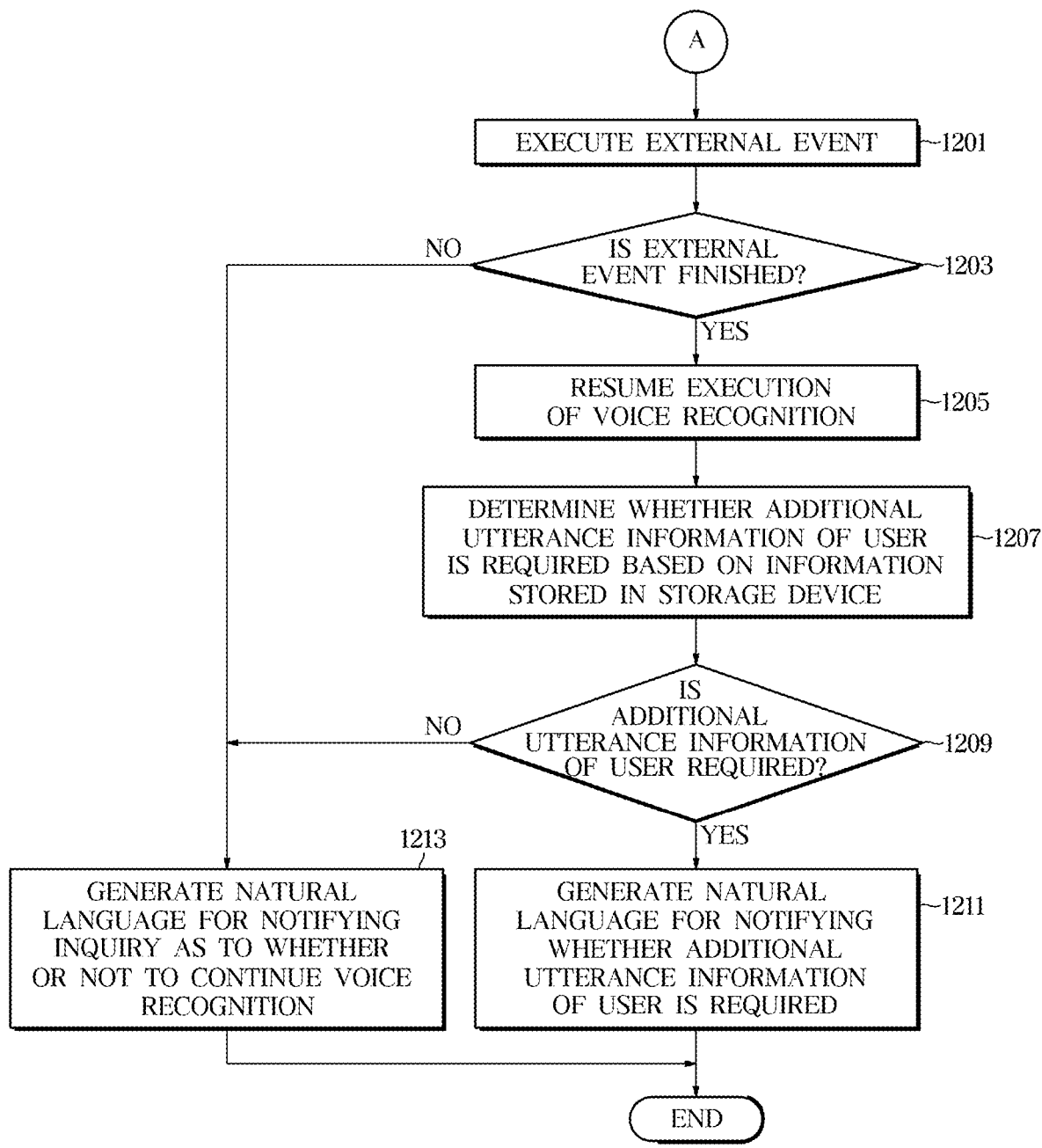
FIG. 12 is a flowchart illustrating a method of controlling the dialogue system according to an exemplary embodiment of the present disclosure.

FIG. 12 is a flowchart illustrating a method of controlling the dialogue system according to an exemplary embodiment of the present disclosure.

When an external event occurs while voice recognition is executed and the priority of the external event is higher than the priority of the voice recognition, the voice recognition may be paused and the external event may be executed (1201).

Thereafter, when the external event is finished (YES in 1203), the voice recognition may be executed again (1205).

In the instant case, the controller 130 may determine whether additional utterance information of the user is required based on the information stored in the storage device 120 (1207).

As a result of the determination, when additional utterance information of the user is required (YES in 1209), a natural language for notifying whether additional utterance information of the user is required may be generated (1211).

As a result of the determination, when the external event is not finished (NO in 1203), or when additional utterance information of the user is not required (NO in 1209), a natural language may be generated for notifying an inquiry as to whether or not to continue the voice recognition (1213).

Figure 13:
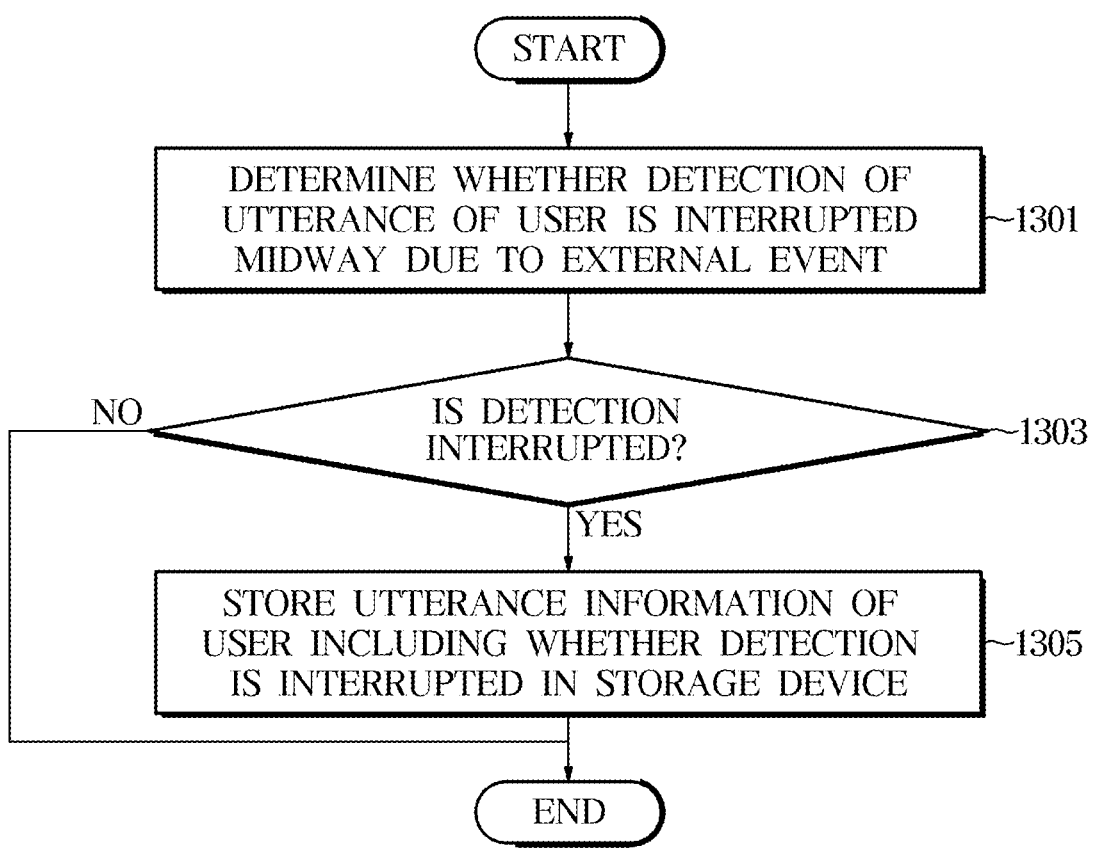
FIG. 13 is a flowchart illustrating a method of controlling the dialogue system according to an exemplary embodiment of the present disclosure.

FIG. 13 is a flowchart illustrating a method of controlling the dialogue system according to an exemplary embodiment of the present disclosure.

The controller 130 may determine whether additional utterance information of the user is required based on the information stored in the storage device 120. To the present end, the controller 130 may determine whether the input of the utterance of the user is interrupted during detection due to an external event.

That is, the controller 130 may determine whether the detection of the utterance of the user is interrupted midway due to an external event (1301), and when the detection is interrupted (YES in 1303), may store the utterance information of the user including whether the detection is interrupted in the storage device 120 (1305).

As is apparent from the above, according to a dialogue system and a control method thereof according to an aspect, even when the voice recognition is interrupted as the execution of voice recognition is paused and resumed when an external event occurs, an action intended by a user can be continued or executed naturally based on the existing information without the user having to re-execute the voice recognition scenario from the beginning, improving the usability and convenience of a voice recognition function.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A dialogue system comprising:
   a voice recognition module provided to execute voice recognition;
   a storage device in which a result of the executed voice recognition is stored; and
   a controller communicatively connected to the voice recognition module and the storage device and configured to
   determine priorities of an external event and the voice recognition when the external event occurs while an utterance of a user is input, and
   pause the execution of the voice recognition and store a result of the voice recognition of the utterance of the user inputted before the pause in the storage device, when the controller concludes that the priority of the external event is higher than the priority of the voice recognition,
   wherein the controller is configured to determine whether the input of the utterance of the user is interrupted during detection due to the external event by analyzing information stored in the storage device,
   wherein, when the controller concludes that the input of the utterance of the user is interrupted during the detection as a result of the determining whether the input of the utterance of the user is interrupted, the controller is configured to re-analyze whether the input of the utterance of the user is interrupted and the utterance of the user determined that the input has been interrupted, and to store a re-analysis result in the storage device,
   wherein the controller is configured to generate a natural language for requesting an additional utterance following the interrupted utterance of the user, and output a voice corresponding to the generated natural language, and
   wherein the controller is configured to determine whether the input of the utterance of the user is interrupted based on detection of at least one signal among an outgoing call signal triggered by a user's input requesting a call, an incoming call signal, and an activation signal of a rear camera, and
   wherein the voice recognition module, the storage device, and the controller are mounted in a voice recognition system in a vehicle.

2. The dialogue system of claim 1, wherein the controller is configured to control the voice recognition module so that the utterance of the user is continuously input when the controller concludes that the priority of the external event is lower than the priority of the voice recognition.

3. The dialogue system of claim 1, further including:
   a natural language understanding (NLU) module provided to execute natural language recognition for a voice-recognized text,
   wherein when the execution of the voice recognition is paused, the controller is configured to control the NLU module to execute the natural language recognition for the utterance of the user inputted before the pause, and to store an execution result of the natural language recognition in the storage device.

4. The dialogue system of claim 1, wherein when the controller concludes that the external event is finished, the controller is configured to resume the voice recognition.

5. The dialogue system of claim 4, wherein the controller is configured to determine whether additional utterance information of the user is required based on the information stored in the storage device.

6. The dialogue system of claim 5, further including:
a natural language generation module provided to generate a natural language,
wherein when the controller concludes that the additional utterance information of the user is required, the controller is configured to control the natural language generation module to generate a natural language for notifying whether the additional utterance information of the user is required.

7. The dialogue system of claim 6, wherein when the controller concludes that the additional utterance information of the user is not required, the controller is configured to control the natural language generation module to generate a natural language for inquiring whether to continue the voice recognition.

8. The dialogue system of claim 7, further including:
a text to speech (TTS) module provided to convert the generated natural language into a form of voice,
wherein the controller is configured to control the TTS module to output the generated natural language in the form of voice.

9. The dialogue system of claim 1, wherein the external event includes one of a phone call transmission/reception, a rear camera display, and a hard key input.

10. A method of controlling a dialogue system, the method comprising:
executing voice recognition by a voice recognition module;
storing a result of the voice recognition in a storage device;
determining, by a controller, a priority of an external event and a priority of the voice recognition when the external event occurs while an utterance of a user is input; and
pausing, by the controller, the execution of the voice recognition and storing a result of the voice recognition of the utterance of the user inputted before the pausing in a storage device, when the priority of the external event is higher than the priority of the voice recognition,
wherein the storing of the result of the voice recognition of the utterance of the user includes:
determining, by the controller, whether the input of the utterance of the user is interrupted during detection due to the external event by analyzing stored information,
when the input of the utterance of the user is interrupted during the detection as a result of the determining of whether the input of the utterance of the user is interrupted, re-analyzing, by the controller, whether the input of the utterance of the user is interrupted and the utterance of the user determined that the input has been interrupted, and storing a re-analysis result in the storage device,
generating a natural language for requesting an additional utterance following the interrupted utterance of the user, and
outputting a voice corresponding to the generated natural language,
wherein the determining whether the input of the utterance of the user is interrupted includes:
detecting at least one signal among an outgoing call signal triggered by a user's input requesting a call, an incoming call signal, and an activation signal of a rear camera, and
determining the input of the utterance of the user is interrupted based on at least one detected signal among an outgoing call signal triggered by a user's input requesting a call, an incoming call signal, and an activation signal of a rear camera, and
wherein the voice recognition module, the storage device, and the controller are mounted in a voice recognition system in a vehicle.

11. The method of claim 10, further including:
controlling, by the controller, so that the utterance of the user is continuously input when the controller concludes that the priority of the external event is lower than the priority of the voice recognition.

12. The method of claim 10, further including:
executing, by the controller, natural language recognition for a voice-recognized text,
wherein the storing of the result of the voice recognition of the utterance of the user includes:
executing the natural language recognition for the utterance of the user inputted before the pausing when the execution of the voice recognition is paused; and
storing an execution result of the natural language recognition.

13. The method of claim 10, further including:
resuming, by the controller, the voice recognition when the controller concludes that the external event is finished.

14. The method of claim 13, further including:
determining whether additional utterance information of the user is required based on the stored information.

15. The method of claim 14, further including:
generating a natural language, wherein the generating of the natural language includes generating a natural language for notifying whether the additional utterance information of the user is required when the controller concludes that the additional utterance information of the user is required.

16. The method of claim 15, wherein the generating of the natural language includes generating a natural language for inquiring whether to continue the voice recognition when the controller concludes that the additional utterance information of the user is not required.

17. The method of claim 16, further including converting the generated natural language into a form of voice.

18. The method of claim 10, wherein the external event includes one of a phone call transmission/reception, a rear camera display, and a hard key input.

* * * * *